United States Patent [19]

King et al.

[11] Patent Number: 4,464,494

[45] Date of Patent: Aug. 7, 1984

[54] ADHESIVE SYSTEM FOR PRODUCTION OF SPIRAL WOUND MEMBRANE ELEMENTS FOR USE IN ORGANIC FLUID MIXTURE SEPARATIONS

[75] Inventors: William M. King, Los Alametos; William W. Wight, Alta Loma, both of Calif.

[73] Assignee: Exxon Research & Engineering Co., Florham Park, N.J.

[21] Appl. No.: 494,409

[22] Filed: May 13, 1983

[51] Int. Cl.$^3$ .................. C08G 59/44; C08G 59/54
[52] U.S. Cl. ................................. 523/400; 156/330
[58] Field of Search .......................... 523/400; 156/330

[56] References Cited

U.S. PATENT DOCUMENTS

| | | | |
|---|---|---|---|
| 2,915,490 | 12/1959 | Hopper et al. | 156/330 |
| 3,042,545 | 7/1962 | Kienle et al. | 156/330 |
| 3,173,867 | 3/1965 | Michaels | 210/321 |
| 3,256,135 | 6/1966 | Weinheimer et al. | 156/330 |
| 3,367,504 | 2/1968 | Westmoreland | 210/321 |
| 3,367,505 | 2/1968 | Bray | 210/321 |
| 3,386,583 | 6/1968 | Merten | 210/321 |
| 3,397,790 | 8/1968 | Newby et al. | 210/321 |
| 3,417,870 | 12/1968 | Bray | 210/321 |
| 3,542,203 | 11/1970 | Hancock et al. | 210/321 |
| 3,551,249 | 12/1970 | Harp et al. | 156/330 |
| 3,637,579 | 1/1972 | Barie et al. | 156/330 |
| 3,668,837 | 6/1972 | Gross | 55/158 |
| 3,813,334 | 5/1974 | Bray | 210/321 |
| 3,852,198 | 12/1974 | Murakami | 210/321 |
| 3,872,014 | 3/1975 | Schell | 210/232 |
| 3,933,646 | 1/1976 | Kanamura | 210/321 |
| 3,962,096 | 6/1976 | Ishii | 210/433 |
| 3,966,616 | 6/1976 | Bray | 210/433 |
| 4,083,780 | 4/1978 | Call | 210/23 H |
| 4,128,525 | 12/1978 | Yeakey et al. | 156/330 |
| 4,180,487 | 12/1979 | Floyd | 523/400 |

FOREIGN PATENT DOCUMENTS

| | | | |
|---|---|---|---|
| 758564 | 5/1967 | Canada | 156/330 |
| 39-10508 | 6/1964 | Japan | 156/330 |
| 48-27454 | 8/1973 | Japan | 156/330 |
| 53-3023875 | 3/1978 | Japan . | |
| 53-3124179 | 10/1978 | Japan . | |
| 55-161842 | 12/1980 | Japan | 523/400 |
| 56-6129006 | 10/1981 | Japan . | |
| 1413841 | 11/1975 | United Kingdom | 156/330 |
| 2063705 | 6/1981 | United Kingdom . | |

OTHER PUBLICATIONS

Condensed Chemical Dictionary, 7th Ed., Rose & Rose editors, Reinhold Pub. Corp., N.Y., p. 379.
Estane Polyurethanes Service Bulletin, B. F. Goodrich Co., "Estane Resin Compatibility," TSR 65-05 TF116.

*Primary Examiner*—Ronald W. Griffin
*Attorney, Agent, or Firm*—Joseph J. Allocca

[57] ABSTRACT

In fabricating a reverse osmosis spiral wound apparatus for the separation of organic fluid mixtures, especially for the separation of dewaxing solvents containing ketone from dewaxed oil by permeation through a permeable membrane such as pretreated regenerated cellulose or asymmetric polyimide a special epoxy adhesive formulation is used to form the membrane element edge seals which serve to define separate permeate zones and feed stream zones. This special adhesive formulation is characterized by having a relatively long pot life, (i.e. will not set too quickly) permitting it to be easily handled during application to the membrane edges in the course of element fabrication, as well as being flexible (trimable) and of proper viscosity.

23 Claims, No Drawings

ADHESIVE SYSTEM FOR PRODUCTION OF SPIRAL WOUND MEMBRANE ELEMENTS FOR USE IN ORGANIC FLUID MIXTURE SEPARATIONS

In fabricating a reverse osmosis spiral wound apparatus for the separation of organic fluid mixtures, especially for the separation of dewaxing solvents containing ketone from dewaxed oil by permeation through a permeable membrane a special epoxy adhesive formulation is used to form the membrane element edge seals which serve to define separate permeate zones and feed stream zones. This special adhesive formulation is characterized as having a relatively long pot life, (e.g. pot life of about 30 minutes or longer meaning the formulation will not set too quickly) permitting it to be easily handled during application to the membrane edges in the course of element fabrication, as well as being flexible, trimable and of proper viscosity to permit winding of multi-leaf elements. The adhesive also thoroughly wets the membrane and the permeate spacer when the membrane edge seals are formed thus insuring the absence of edge seal leaks. This adhesive is resistant to solvents such as water, methanol, methyl ethyl ketone, methyl isobutyl ketone, toluene, ethers, benzene, hexane, dioxane, DMF, per halogenated hydrocarbon (e.g. generally of the freon type) but is not resistant to materials such as acetic acid, NMP or incompletely halogenated hydrocarbons such as methylene chloride or chloroform.

The special adhesive which meets these criterion comprises a ketone resistant epoxy formulation which is (1) a reaction product of bisphenol-A and epichlorohydrin, (2) a thickening agent (such as fumed silica), (3) a polyamide or amidoamine low temperature low exotherm curing agent such as one identified as Versamid 140, (4) a diluent selected from DMF, methanol, isopropanol, acetone, hexane, toluene, methylenechloride, methyl ethyl ketone, tetrahydrofuran, dimethylsulfoxide, dimethylacetamide and preferably (5) a urethane flexibilizer (such as Estane 5707F-1). Use of such a flexibilizer requires that the diluent solvent selected be, or at least include DMF, THF or other solvent in which the polyurethane is soluble. This formulation will include the above components 1, 2, 3 and 4 in a ratio based on parts by weight of about 100/0-15/40-70/8-32, preferably about 100/10/60/12. The formulation comprising components 1, 2, 3, 4 and 5 will have the above identified materials present in a ratio based on parts by weight of about 100/0-15/40-70/8-32/2-8, most preferably 100/10/60/12/4. The edge seal adhesive will cure in from 1-21 days at a temperature of from about 25°-60° C. Lower temperatures require longer times but are preferred so as to avoid damage to the membrane materials which can result from exposure to elevated temperatures. A curing temperature of about 25° C. requiring a curing time of about 7-21 days is preferred.

Waxy hydrocarbon streams are solvent dewaxed employing any one of a number of different processes. Representative, non-limiting examples include solvent dewaxing processes employing indirect heat exchange in scraped surface chillers wherein waxy oil and solvent, at approximately the same temperature, are mixed in such a manner so as to effect complete and thorough solution of the oil in the solvent before being cooled or chilled. This solution is then cooled in the scraped surface chiller at a uniform, slow rate under conditions which avoid agitation of the solution as the wax precipitates out.

Another well-known method of solvent dewaxing involves conventional, incremental solvent addition. In this method, solvent is added to the oil at several points along a chilling apparatus. The waxy oil is first mixed with solvent then chilled until some wax crystallization has occurred and the mixture has thickened considerably. A first increment of solvent is introduced at this point in order to maintain fluidity, cooling continues and more wax is precipitated. A second increment of solvent is added to maintain fluidity. This process is repeated until the desired oil-wax filtration temperature is reached, at which point an additional amount of solvent is added in order to reduce the viscosity of the mixture to that desired for the filtration step. In this method the temperature of the incrementally added solvent should also be about the same as that of the wax/oil/solvent mixture at the point of introduction. If the solvent is introduced at a lower temperature, shock chilling of the slurry usually occurs, resulting in the formation of small and/or acicula shaped wax crystals with attendant poor filter rate.

Still another well-known process is the DILCHILL[R] process wherein a waxy oil is introduced into an elongated, staged cooling zone or tower at a temperature above its cloud point and incrementally introducing cold dewaxing solvent into said zone, along a plurality of points or stages therein, while maintaining a high degree of agitation so as to effect substantially instantaneous mixing of the solvent and wax/oil mixture as they progress through said zone and resulting in the precipitation of at least a portion of the wax present in the waxy oil. The basic concept is shown in U.S. Pat. No. 3,773,650 while a modification thereof which employs the aforementioned high agitation chilling zone augmented by a subsequent, separate and distinct scraped surface chilling zone is presented in U.S. Pat. No. 3,775,288, the disclosures of both of which are incorporated herein by reference.

[R] Registered service mark of Exxon Research and Engineering Company.

Typical ketone containing dewaxing solvents are (a) the aliphatic ketones having from 3 to 6 carbon atoms and mixtures thereof, such as acetone, methyl ethyl ketone (MEK) and methyl isobutyl ketone (MIBK), and (b) mixtures of the aforesaid ketones with $C_6$-$C_{10}$ aromatics such as benzene, xylene and toluene. Preferred solvents are MEK/MIBK and MEK/toluene.

Solvent dewaxing may be practiced on any waxy hydrocarbon oil stock, preferably waxy petroleum oil stock or distillate fraction thereof, more preferably waxy lube oil, transformer oil, white oil or fuel oil stocks. Illustrative, non-limiting examples of waxy stocks are (a) distillate fractions that have a boiling range within the broad range of about 500° F. to about 1300° F., with preferred stocks including the lubricating oil and specialty oil fractions boiling within the range of between about 500° F. and 1200° F., (b) bright stocks and deasphalted resids having an initial boiling point about 800° F., and (c) broad cut feedstocks that are produced by topping or distilling the lightest material off a crude oil leaving a broad cut oil, the major portion of which boils above about 500° F. or 650° F. Additionally, any of these feeds may be hydrocracked prior to distilling, dewaxing or topping. The distillate fractions may come from any source such as the paraffinic crudes obtained from Aramco, Kuwait, the Pan Handle, North Louisiana, etc., naphthenic crudes, such as Tia Juana, Coastal crudes, etc., as well as the relatively heavy feedstocks, such as bright stocks having a boiling range of 1050+° F. and synthetic feedstocks derived from Athabasca Tar Sands, shale, etc.

Spiral wound elements are well known in the separations art and generally comprise a perforated central tube which collects the permeate, which tube is surrounded by layers of permeation membrane, and alternating layers between the membrane layers of feed spacers and permeate spacers with the edges of the membrane layers surrounding the permeate spacers being sealed to sandwich the permeate spacer into a closed envelope in fluid communication with the perforated central tube leaving the perforated central tube as the only permeate outlet. Spiral wound elements take many varied forms and are generally described in U.S. Pat. Nos. 3,417,870, 3,173,867, 3,367,594, 3,386,583, 3,397,790, 3,813,334, 3,966,616, 3,668,837, 3,852,198 hereby incorporated by reference. What is common to most spiral wound elements, however, is the formation of a membrane edge seal around the permeate spacer layer to define a permeate zone isolated from the feed stream zone.

Spiral wound elements for the practice of the separation of dewaxing solvents containing ketone from dewaxed oil can be made from specially pretreated regenerated cellulose as disclosed in U.S. Ser. No. 263,307 and U.S. Ser. No. 263,116 (see also EP Publication No. 13834), or from asymmetric polyimide membranes as disclosed in copending applications OP-2858 (U.S. Ser. No. 494,281) and OP-2894 (U.S. Ser. No. 494,543) the disclosures of which are hereby incorporated by reference. Further, the spiral wound elements require the use of a perforated central mandrel (tube) for the collection of permeate, feed spacers, permeate spacers, (as described above) and also antitelescoping rings, various seals and an outer wrapper. In fabricating the spiral wound elements useful for the separation of organic fluids, especially dewaxing solvent containing ketone from dewaxed oil the central mandrel, permeate spacer, feed spacer, antitelescoping rings, seals and outer wrapper are all made of materials now currently in use in producing spiral wound elements for aqueous separations. Thus, the central mandrel for example, may be made of metal, Nylon 6 or other solvent resistant plastic, the permeate spacer may be made of melamine formaldehyde impregnated polyester (e.g. SIMPLEX), the feed spacer may be made of polypropylene mesh (e.g. VEXAR), the anti-telescoping ring of Nylon 6, the seals of butyl rubber and the outer wrapper of epoxy reinforced fiberglass (e.g. fiberglass and Ciba Geigy Epoxy 0500+2964 hardner).

However, in producing a spiral wound element for use in the hostile environment of organic solvents, especially dewaxing solvents containing ketone and dewaxed oil, the membrane edge seal adhesive must be specially formulated.

It has been discovered that the membrane edge seal adhesive which meets the requirements of useful pot life (for manageability and ease of handling) is flexible (thereby permitting the multi-leaf membrane-permeate spacer-membrane sandwich to be trimmed), is resistant to organic solvent, especially dewaxing solvents containing ketones and is of the proper viscosity to penetrate the permeate spacer and membrane surface at the membrane edge (so as to form the above described envelope) while not running out of the edge or over the entire surface, comprises an epoxy resin formulation which is (1) a reaction product of bisphenol-A and epichlorohydrin having a viscosity in the range of about 7000 to 20,000 centipoise preferably 10,000 to 16,000 centipoise at 25° C. (ASTM D445) with a weight per epoxide (WPE) of about 175-210, preferably about 185-195, (2) a thickening agent [such as Cabosil M-5], (3) a polyamide or amidoamine low temperatures, low exotherm curing agent such as a condensation product of polyamine with fatty acids or dimer acids, and having an amine value of between about 85-620, preferably about 370-620, more preferably about 370-400 or 580-620, (4) a diluent from the group of DMF, methanol, isopropanol, acetone, hexane, toluene, methylene chloride, methylethyl ketone, tetrahydrofuran, dimethysulfoxide, dimethylacetamide, and preferably (5) a high molecular weight polyurethane flexibilizer (such as Estane 5707F-1). The use of a polyurethane flexibilizer requires that the diluent should be, or at least should include DMF, THF or other solvent in which the urethane component is soluble in order to dissolve the polyurethane. This formulation will include the above components 1/2/3/4 in a ratio, based on parts by weight of about 100/0-15/40-70/8-32, most preferably about 100/10/60/12.

The formulation comprising components 1/2/3/4/5 will employ the components in a ratio based on parts by weight about 100/0-15/40-70/8-32/2-8, most preferably about 100/10/60/12/4.

The use of a flexibilizer makes the multi-leaf element membrane edges readily trimable. Use of the formulation without the polyurethane flexibilizer will yield an adhesive which forms a strong, solvent resistant edge seal but which rapidly becomes brittle and hard after curing making trimming difficult if not impossible unless care is taken to insure that trimming is performed before the adhesive becomes brittle. By adding the polyurethane flexiblizer the edge seal remains pliable and somewhat rubbery for a relatively long time, thus facilitating trimming during element fabrication.

The use of the diluent, surprisingly, permits the formation of an adhesive which upon curing is more solvent resistant than the formulation without the diluent.

The most preferred formulation comprises Epon 828, Cabosil M5, a curing agent identified as Versamid 140 (from Henkel), a flexibilizer identified as Estane 5707F-1 (B. F. Goodrich) and DMF diluent in a ratio 100/10/60/4/12. Elements made using the adhesive have membrane edge seals which cure at about 25° C. over a period of about 21 days. The edge seals are flexible (do not crack) can be trimmed and stand up well to use conditions.

The various components which go to make up the adhesive formulation of the present invention are available from commercial sources. Suitable reaction products of bisphenol A and epichlorohydrin are available, for example, from Shell Chemical Company under the designation Epon 828, Epon 830, Epon 825 and Epon 826; from Reichold Chemical Company under the designation EpoTuf 37-139, EpoTuf 37-140, EpoTuf 37-141; from Ciba Geigy Corporation under the designation Araldite 6005, 6010 and 6020; from Celanese Corporation as Epi-Rez 508, 509 and 510; and from Dow Chemical Company under the designation D.E.R. 330, 331, 332, 317 and 337. Suitable low temperature, low exotherm polyamide or amidoamine curing agents are available, for example from Henkel Corp. under the designation Versamid 140 (which has an amine value of about 370-400), Versamid 115, Versamid 125 and Versamid 150 or Genamid 2000 (which has an amine value of about 580-620) and Genamid 250; from Ciba Geigy Corporation under the designation 815, 825 and 840 and from Shell Chemical Company under the designation V-15, V-25 and V-40. Suitable high molecular weight thermosetting polyurethanes are available, for example, from B. F. Goodrich under the designation Estane 5701, 5713, and 5707 F-1. Suitable thickening agents are available, for example, from Cabot Corporation under the designation Cabosil M-5, Cabosil MS-7, and MS-5 and from Degussa Corporation under the designation Aerosil 200, 300 and 380. These fumed silica thickening agents can also be combined with some aluminum oxide (<50%) such as that available from Degussa under the designation aluminum oxide-C. The thickening agent is used to improve the anti-slump character of the adhesive, i.e., insure that it is not too fluid so it will not run out of the edge of the element or flow into the interior of the element before the adhesive sets.

EXAMPLES I–XXIV

Solvent Resistance

The following Tables show the ketone resistance of coupons made by sandwiching adhesive filled permeate spacers (melamine formaldehyde impregnated Dacron (Simplex)) between two pieces of PM250 Regenerated Cellulose (ENKA; 17.5μ, about 12,000 molecular weight cut off). One layer of PM250 was removed from one face of the coupon before the coupons were immersed in methyl ethyl ketone at room temperature for one month. Thus, the adhesive on the exposed face of the coupon was directly exposed to the ketone solvent. Components are reported in parts by weight.

TABLE 1

|  | Epon 828 | Versamid 140 | Estane 5707F-1 | DMF | Other Solvent | Cure Time Days | Cure Time Temp. °C. | Adhesive Conditions After Immersion in MEK* |
|---|---|---|---|---|---|---|---|---|
| I | 100 | 60 | — | — | — | 1 | 60 | 3 |
| II | 100 | 60 | — | — | — | 7 | 25 | 1 |
| III | 100 | 60 | — | — | — | 21 | 25 | 2 |
| IV | 100 | 60 | 4 | 12 | — | 1 | 60 | 4 |
| V | 100 | 60 | 4 | 12 | — | 7 | 25 | 4 |
| VI | 100 | 60 | 4 | 12 | — | 21 | 25 | 5 |
| VII | 100 | 60 | — | 12 | — | 1 | 60 | 4 |
| VIII | 100 | 60 | — | 12 | — | 7 | 25 | 4 |
| IX | 100 | 60 | — | 12 | — | 21 | 25 | 4 |
| X | 100 | 60 | — | — | 12 MEK | 1 | 60 | 5 |
| XI | 100 | 60 | — | — | 12 MEK | 7 | 25 | 4 |
| XII | 100 | 60 | — | — | 12 MEK | 21 | 25 | 4 |
| XIII | 100 | 60 | — | — | 12 THF | 1 | 60 | 4 |
| XIV | 100 | 60 | — | — | 12 THF | 7 | 25 | 4 |
| XV | 100 | 60 | — | — | 12 THF | 21 | 25 | 4 |
| XVI | 100 | 60 | — | — | 12 DMSO | 1 | 60 | 4 |
| XVII | 100 | 60 | — | — | 12 DMSO | 7 | 25 | 4 |
| XVIII | 100 | 60 | — | — | 12 DMSO | 21 | 25 | 4 |
| XIX | 100 | 60 | — | — | 12 Methylene Chloride | 1 | 60 | 4 |
| XX | 100 | 60 | — | — | 12 Methylene Chloride | 7 | 25 | 4 |
| XXI | 100 | 60 | — | — | 12 Methylene Chloride | 21 | 25 | 4 |

*On a scale of 0 to 5, where 0 = destroyed and 5 = excellent. Condition determined by pulling on the spacer attached to the membrane after one month in MEK.

TABLE 2

|  | Epon 830 | Carbosil M-5 | Genamid 2000 | Estane 5707F-1 | DMF | Catalyst DMP-30[1] | Cure Time Days | Cure Time °C. | Adhesive Conditions After Immersion in MEK* |
|---|---|---|---|---|---|---|---|---|---|
| XXII | 100 | 10 | 43 | 4 | 12 | 5 | 1 | 60 | 4 |
| XXIII | 100 | 10 | 43 | 4 | 12 | 5 | 7 | 25 | 5 |
| XXIV | 100 | 10 | 43 | 4 | 12 | 5 | 21 | 25 | 5 |

*On a scale of 0 to 5, where 0 = destroyed and 5 = excellent. Condition determined by pulling on the spacer attached to the membrane after one month in MEK.
[1]DMP-30 is 2,4,6-tri (dimethylaminomethyl) phenol. Curing catalyst can be used in these formulations BUT their use is not essential to preparing excellent adhesives.

EXAMPLE XXV

Examples of adhesive systems with room temperature cures that are ketone resistant yet are unsuitable for use in spiral-wound elements.

Formulation 1:
| | |
|---|---|
| Epoxy Resin Ciba Geigy 0500* | 100, |
| Cabosil M5 Thickener | 10, |
| Ciba Geigy Curing Agent 2964 | 86, |
| Estane 5707F-1 | 2, |
| DMF | 8. |

*Ciba Geigy 0500 epoxy is a low viscosity, high functionality (~3) amine based resin Formulation 2:
| | |
|---|---|
| Epoxy Resin Epon 828 | 100, |
| Cabosil M5 Thickener | 10, |
| Triethylenetetramine | 5.5, |
| Diethylenetriamine | 5.5, |
| Estane 5707F-1 | 2, |
| DMF | 8. |

These two formulations are ketone resistant with good bond strength to steel, fabrics and membranes, but the adhesive systems have short (less than 20 minutes) pot lives and exotherm during cure in 8-inch diameter elements. The higher temperatures thus produced during cure cause these adhesives to become very hard and very brittle very quickly, thereby making the trimming of the spiral-wound membrane elements impossible.

Formulation 3:
Epoxy resin Epon 828    100,
Cabosil    10,
Versamid 140    60,
DMF    8.

This formulation without Estane 5707F-1 is ketone resistant, however, the resultant adhesive system after cure is brittle and makes trimming the element very difficult, if not impossible, because the brittle adhesive tends to introduce cracks in the membrane during the trimming operation.

However, since the adhesive cures slowly, if care is taken the edges can be trimmed while the adhesive is still pliable. Preferably, however, the formulation will include a polyurethane flexibilizer to facilitate such handling.

EXAMPLE XXVI

Epon 828 was combined with Epon 871 in the ratio 70% Epon 828, 30% 871 and then combined with Cabosil M5, Versamid 140 and DMF in a ratio based on parts by weight of 100 (total of both Epons)/10/60/12. The adhesive was destroyed by ketone. Epon 871 is a flexible epoxy and was added to make the system flexible and trimable. Epon 871 is an aliphatic epoxy. Aliphatic epoxy resins do not exhibit good solvent resistance properties. Use of this resin destroys the ketone resistance of the adhesive.

EXAMPLE XXVII

Polyimide membranes prepared and used in accordance with the procedure described and claimed in copending application OP 2894 U.S. Ser. No. 494,543 "Asymmetric Polyimide Reverse Osmosis Membrane, Method for Preparation of Same and Use Thereof For Organic Liquid Separation," Wan, Shuey, inventors, were fabricated into a spiral-wound element measuring 8 inches×40 inches (having a surface area of about 225 sq. feet) using the preferred adhesive formulation described above. As reported therein, the element was tested for the separation of different grades of dewaxed oil feeds from MEK/MIBK (60/40) over a period of time. The element showed good performance and was still satisfactorily operating in the test unit after about 6 months under real conditions, (operating pressure about 400 psi, temperature about 45° C.).

What is claimed is:

1. A solvent resistant adhesive for use in producing membrane edge seals in the production of elements, which are suitable for organic fluid separations, which adhesive comprises an epoxy resin formulation which is (1) a reaction product of bisphenol-A and epichlorohydrin, (2) a thickening agent, (3) a low temperature, low exotherm polyamide or amidoamine curing agent, and (4) a diluent wherein the components 1/2/3/4 are present in a ratio based on parts by weight of about 100/0-15/40-70/8-32.

2. The adhesive formulation of claim 1 wherein the reaction product of bisphenol-A and epichlorohydrin has a viscosity in the range of about 7000 to 20,000 centipoise at 25° C. (ASTM D445) with a weight per epoxide (WPE) of about 175-210.

3. The adhesive formulation of claim 2 wherein the reaction product of bisphenol-A and epichlorohydrin has a viscosity in the range of about 10,000 to 16,000 centipoise at 25° C. (ASTM D445) with a weight per epoxide (WPE) of about 185-195.

4. The adhesive formulation of claim 3 wherein the thickening agent is fumed silica.

5. The adhesive formulation of claim 1 wherein the polyamide or amidoamine curing agent is a condensation product of a polyamine with fatty acids or dimer acids and wherein the curing agent has an amine value of between about 85-620.

6. The adhesive formulation of claim 5 wherein the curing agent has an amine value of between about 580-620.

7. The adhesive formulation of claim 5 wherein the curing agent has an amine value of between about 370-400.

8. The adhesive formulation of claim 7 wherein the diluent added so as to help impart solvent resistance to the adhesive is selected from dimethylformamide, methanol, isopropanol, acetone, hexane, toluene, methylene chloride, methylethyl ketone, tetrahydrofuran, dimethylsulfoxide, dimethylacetamide.

9. The adhesive formulation of claim 8 wherein the components 1/2/3/4 are present in a ratio based on parts by weight of about 100/10/60/12.

10. The adhesive formulation of claim 9 further comprising component (5) a high molecular weight polyurethane flexibilizer.

11. The adhesive formulation of claim 10 wherein components 1/2/3/4/5 are present in a ratio based on parts by weight of about 100/0-15/40-70/8-32/2-8.

12. The adhesive formulation of claims 1, 2, 3, 4, 5, 6, 7, 8, 9, 10 or 11 wherein the adhesive is used for the production of membrane edge seals in the fabrication of spiral wound elements.

13. A method for producing membrane edge seals by means of an adhesive in the production of elements for use in organic fluid separations wherein the adhesive comprises an epoxy resin formulation which is (1) a reaction product of biphenol-A and epichlorohydrin, (2) a thickening agent, (3) a low temperature, low exotherm polyamide or amidoamine curing agent, and (4) a diluent wherein the components 1/2/3/4 are present in a ratio based on parts by weight of about 100/0-15/40-70/8-32.

14. The method of claim 13 wherein the reaction product of bisphenol-A and epichlorohydrin has a viscosity in the range of about 7000 to 20,000 centipoise at 25° C. (ASTM D445) with a weight per epoxide (WPE) of about 175-210.

15. The method of claim 14 wherein the reaction product of bisphenol-A and epichlorohydrin has a viscosity in the range of about 10,000 to 16,000 centipoise at 25° C. (ASTM D445) with a weight per epoxide (WPE) of about 185-195.

16. The method of claim 15 wherein the thickening agent is fumed silica.

17. The method of claim 14 wherein the polyamide or amidoamine curing agent is a condensation product of a polyamine with fatty acids or dimer acids and wherein the curing agent has an amine value of between about 85-620.

18. The adhesive formulation of claim 17 wherein the curing agent has an amine value of between about 580–620.

19. The method of claim 17 wherein the curing agent has an amine value of between about 370–400.

20. The adhesive formulation of claim 19 wherein the diluent is selected from dimethylformamide, methanol, isopropanol, acetone, hexane, toluene, methylene chloride, methylethyl ketone, tetrahydrofuran, dimethylsulfoxide, dimethylacetamide.

21. The adhesive formulation of claim 20 wherein the components 1/2/3/4 are present in a ratio based on parts by weight of about 100/10/60/12.

22. The adhesive formulation of claim 21 further comprising component (5) a high molecular weight polyurethane flexibilizer.

23. The adhesive formulation of claim 22 wherein components 1/2/3/4/5 are present in a ratio based on parts by weight of about 100/0-15/40-70/8-32/2-8.

* * * * *